March 30, 1954     J. B. RESWICK     2,673,492
ACCESSORY FOR CATHODE-RAY APPARATUS
Filed Aug. 4, 1950

Inventor.
James B. Reswick.
by Kenway Jenney Witter & Hildreth
Attys.

Patented Mar. 30, 1954

2,673,492

UNITED STATES PATENT OFFICE 2,673,492

ACCESSORY FOR CATHODE-RAY APPARATUS

James B. Reswick, Newtonville, Mass., assignor to Robert A. Waters, Inc., Waltham, Mass., a corporation of Massachusetts Application August 4, 1950, Serial No. 177,594

2 Claims. (Cl. 88—74)

The present invention relates to cathode ray apparatus and more particularly to an optical device whereby a cathode-ray trace may be rapidly and accurately drawn or measured.

Heretofore, the only available method of obtaining a permanent record from the trace of a cathode ray oscilloscope has been by photography. However, in view of the necessity of development, this procedure has not been satisfactory. A measurement of the trace is frequently desired; this has been afforded by a scale on the tube face, but may be inaccurate because of parallax.

The object of the present invention is to provide a simple optical device, whereby an image of the trace may be superimposed on a sheet of paper, where it may be manually sketched by pen or pencil. The paper may be either plain or coordinate paper, and in the latter case an accurate graph is obtained. If desired the image may be scaled, whereby a measurement may be made without the necessity of tracing if so desired.

Figure 1:
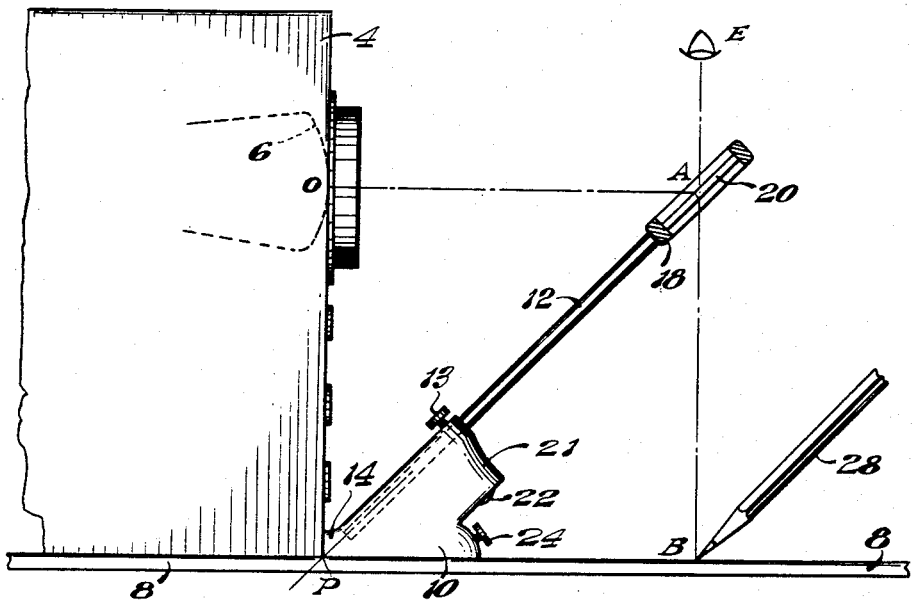
Figure 2:
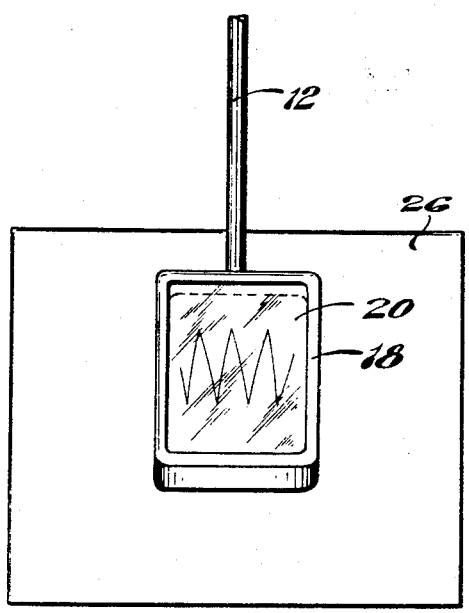

In the accompanying drawings Fig. 1 is a side elevation of the preferred form of optical instrument according to the present invention, and Fig. 2 is a plan view showing the image of the trace on the paper.

In Fig. 1 there is shown the front portion of a cathode ray oscilloscope having a case 4 and tube 6. The case of the oscilloscope is adapted to rest on a table as indicated at 8.

The optical instrument of the present invention comprises a heavy metal base 10, of a form to receive a sliding rod 12 at an angle of 45° with the plane of the bottom surface of the base. The rod 12 is adapted to be held in position by a setscrew 13. The base 10 has a rear extension or foot 14 having a wide portion adapted to abut the front of the case 4 of the oscilloscope. The dimensions of the base 10 are such that the axis of the rod 14, when extended, passes through the point indicated at P, which is at the intersection of the face 4 and table 8.

The rod 12 carries at its upper end a frame 18 enclosing a mirror 20. It will be observed that the plane of the mirror is at exactly 45° from the table 8 and also 45° from the vertical face 4 of the oscilloscope. Preferably the upper surface of the mirror is provided with a high-reflectance coating which causes a large part of the oscilloscope light to be reflected and the lower surface with a high-transmission coating, so that as little light as possible from the table 8 is lost by reflection from the bottom surface of the mirror 20, and a semi-transparent mirror is formed which reflects upward the oscillogram and transmits the image of the table 8. The manner of coating will be understood by those skilled in the art.

The base is provided with an overhanging portion 21. A lamp 22 is housed in the base and is disposed beneath the overhang. The lamp is controlled by a switch 24. By means of the lamp a sheet of paper under the mirror may be illuminated.

In operation a sheet of paper is laid on the table immediately under the mirror. The paper is indicated in Fig. 2 at 26. The optical system is such that the image of the trace on the oscilloscope is formed exactly on the sheet of paper 26. This follows from the fact that the plane of the mirror is at exactly 45° from both the face of the oscilloscope and from the table, whereby the distance from the tube to the mirror (indicated at OA) is equal to the distance AB from the mirror to the paper. Therefore, if the observer's eye is placed as shown at E, the observer will see an image of the cathode-ray trace in exact superposition on the paper. The accuracy of the superposition will depend on the curvature of the tube face. However, with standard tubes mounted in standard manner, the distances OA and AB will be equal. This is determined by the size of the extension 14 of the base. With tubes of non-standard curvature or those which are recessed in non-standard fashion, some adjustment of the base 10 with respect to the case 4 may be required, namely, by either moving the base forwardly or by supporting it on a thin sheet of cardboard or other material to bring it to the right height. It will be observed that all necessary adjustments may be made either by moving the base 10 forwardly or by lifting it slightly. The oscillogram may then be sketched by means of pencil or pen as indicated by the pencil 28 in Fig. 1. Both the pencil and the paper may be illuminated by the lamp, in order that the observer may accurately follow the image, the eye being shielded from the direct rays of the lamp by the overhang 21. If a record of the wave form is not required, the oscillogram may be actually measured by means of a ruler or ruled paper. It will be understood that this measurement is considerably more accurate than can be obtained by a reading of the trace itself, since the accuracy of the reading is affected by the curvature of the tube, and also by the necessity of introducing a scale on the tube surface itself, and in either case, it is difficult to avoid parallax.

In setting up the instrument a quick test for parallax will indicate whether the adjustments have been properly made. On moving the eye back and forth slightly, there should be no relative movement between the image of the trace and the paper. If such a relative movement occurs it will be necessary to adjust the base 10 with respect to the oscilloscope, as above described. When the no-parallax condition has been attained, the instrument in adjustment and the desired measurement or tracing may be then readily made.

Adjustments for different oscilloscopes are readily made by merely sliding the rod 12 and resetting it. By reason of 45° angle the device automatically compensates for height for all standard tubes and tube mountings.

Having thus described the invention, I claim:

1. An optical instrument for producing an image of an oscilloscope tube face upon a drawing surface normal thereto, comprising a rigid base member having a plane bottom surface adapted to rest upon the drawing surface, a rod supported in the base member at a fixed angle of 45° with respect to said bottom surface, a plane semi-transparent mirror carried by the rod at the same angular orientation, said base member also having a side surface adapted to bear upon the tube support when the instrument is moved into a viewing position, wherein the extended axis of the rod intersects the line of intersection of the planes of the tube face and drawing surface, and wherein a virtual reflected image of the tube face is formed upon the drawing surface when viewed normally to said surface through the mirror, and a lamp secured in the base member in position to illuminate the drawing surface, said base member having an overhanging portion to shield the tube face from the lamp when oriented in said viewing position.

2. An optical instrument for producing an image of an oscilloscope tube face upon a drawing surface normal thereto, comprising a rigid base member having a plane bottom surface adapted to rest upon the drawing surface, a rod supported in the base member at a fixed angle of 45° with respect to said bottom surface, a plane semi-transparent mirror carried by the rod at the same angular orientation, said base member also having a side surface joining the bottom surface in a line intersecting the extended axis of the rod, the side surface being adapted to bear upon the tube support when the instrument is moved into a viewing position wherein said side surface lies in the plane of the tube and a virtual reflected image of the tube face is formed upon the drawing surface when viewed normally to said surface through the mirror, and a lamp secured in said base member in position to illuminate the drawing surface, said base member having an overhanging portion to shield the tube face from the lamp when oriented in said viewing position.

JAMES B. RESWICK.

References Cited in the file of this patent

UNITED STATES PATENTS

| Number | Name | Date |
| --- | --- | --- |
| 751,290 | Jaeger | Feb. 2, 1904 |
| 2,026,009 | Ritz-Woller | Dec. 31, 1935 |
| 2,251,984 | Cleaver et al. | Aug. 12, 1941 |
| 2,301,826 | Steudel et al. | Nov. 10, 1942 |

FOREIGN PATENTS

| Number | Country | Date |
| --- | --- | --- |
| 244,514 | Great Britain | Dec. 16, 1925 |
| 602,849 | France | Jan. 4, 1926 |

OTHER REFERENCES

Soller et al., text "Cathode Ray Tube Displays," pgs. 564–566, 1948 1st edition, published by McGraw-Hill Book Co., New York. (Photostatic copy of pages 564–566 in Division 7.)